3,504,045
ISOMERIZATION OF ALPHA ISOPROPYL
NAPHTHALENE TO BETA ISOPROPYL
NAPHTHALENE
Edward Jonathan Scharf, Somerville, and Herbert Rudolph Kemme, Flemington, N.J., assignors to American Cyanamid Company, Stamford, Conn., a corporation of Maine
No Drawing. Continuation-in-part of application Ser. No. 724,625, Apr. 26, 1968. This application June 3, 1969, Ser. No. 830,145
Int. Cl. C07c 15/24, 5/24
U.S. Cl. 260—668        2 Claims

ABSTRACT OF THE DISCLOSURE

The ratio of beta to alpha isomer content in a mixture of alpha and beta isopropyl naphthalenes is substantially increased by contacting the mixture with a solid phosphoric acid catalyst at a temperature above about 275° C.

---

This application is a continuation-in-part of application Ser. No. 724,625, filed Apr. 26, 1868, and now abandoned.

This invention relates to a process for the isomerization of alkylated aromatic hydrocarbons. More particularly, it relates to a process for the isomerization of alpha-isopropyl naphthalene to beta-isopropyl naphthalene.

The alkylation of aromatic hydrocarbons by the Friedel-Crafts reaction or modifications thereof is well known. The product obtained in the alkylation reaction, in most cases, is an isomeric mixture, the specific isomer produced in major amount being dependent to some extent upon the specific preparative method employed. For some purposes an isomeric mixture is satisfactory; in others, for example, where an alkyl naphthalene is to be converted to bet-naphthol by subsequent oxidation and acidification of the oxidized intermediate, it is important that the intermediate be predominantly the beta-isomer in order to ensure the best possible yield of the final product.

In some instances, isomeric mixtures are readily separated because of the differences in physical properties of the isomers, such as by distillation, fractional crystallization. In other cases, the isomers have very closely related physical properties and are difficult to separate except by very tedious and time-consuming procedures. This is particularly true of the separation of alpha- and beta-isopropyl naphthalenes.

In view of the difficulties of resolving isomeric mixtures of alkylated aromatic hydrocarbons, particularly the alpha- and beta-isopropyl naphthalenes, there exists the need for an improved isomerization process which will result in the enrichment of the beta isomer content of these mixtures.

It has now been discovered that by contacting the isomeric mixtures with a solid phosphoric acid catalyst at a temperature above about 275° C., preferably from about 300° C. to about 400° C., the ratio of beta to alpha isomer therein is substantially increased.

According to the present invention, the isomeric mixture to be enriched and at least about 1%, by weight, of a solid phosphoric acid catalyst are charged to a suitable reactor and the mixture thus formed heated with agitation at a temperature above about 275° C. for a suitable period of time, generally, from about ½ hour to several hours. The mixture is then cooled, the catalyst separated, and the product collected.

Any of the solid phosphoric acid catalysts described in U.S. Patent Nos. 2,575,457, 2,584,102, 3,183,233 and 3,201,486 may be used in the invention. In general, the catalysts are comprised of phosphoric acid on siliceous support or adsorbent material, such as kieselguhr. The amount of catalyst used should be at least about 1% by weight of the isomer mixture. Although the reaction appears to be relatively insensitive to catalyst loading, it is preferred to use the catalyst in an amount of from about 5% to about 20% by weight. The catalyst is insoluble in the reaction medium and constitutes a separate, heavier phase, which is easily separated after the reaction, such as by filtration.

The isomerization may be conducted in the presence of an easily removable solvent which is inert to the reaction, such as a hydrocarbon or a halogenated hydrocarbon, such as heptane, benzene or carbon tetrachloride. However, the use of a solvent generally provides no particular advantage.

Also, the isomerization may be conducted in a continuous manner by passing the isomer mixtures over a fixed bed of catalyst at space velocities of from about 1 to about 3 hr.$^{-1}$ operation.

The invention is illustrated by the following examples in which all percentages given are by weight.

EXAMPLE 1

A series of isomerization reactions (Runs 1–9) were carried out according to the following procedure. The feed stock, comprised of alpha- and beta-isopropyl naphthalenes, and the appropriate amount of catalyst were charged to an autoclave which was then purged with nitrogen and sealed. The autoclave was then heated to the desired temperature level, agitation started, and the reaction allowed to proceed for the desired length of time. Agitation was then stopped and the autoclave allowed to cool. The reaction mixtures were then withdrawn and, after the catalyst was separated, analyzed by vapor phase chromatographic methods. The reaction conditions and the results obtained are shown in Table I.

The solid phosphoric acid catalyst used in all of the runs was a calcined mixture of about 21.5% by weight of kieselguhr as adsorbent support and about 78.5% by weight of phosphoric acid containing about 83% $P_2O_5$. The catalyst in this instance was in the form of a powder. However, it may suitably be in the form of pellets, granules, or the like.

As will be seen from the data in Table I, when the isomerization reaction is conducted at temperatures up to 200° C., no increase in the ratio of beta- to alpha-isopropyl naphthalene is effected (Runs 1–4). On the other hand, when the reaction is conducted at 275° C., or higher (Runs 5–9) the ratio is substantially increased, with the highest increases being obtained in Runs 6–9 where the higher, preferred temperatures were used. It is thus seen that the conversion of the alpha to the beta isomer is essentially dependent on the temperature used in the isomerization reaction. The increase of beta-isomer in the alpha, beta isomer mixtures thus accomplished is, of course, highly advantageous from a commercial standpoint.

EXAMPLES 2–6

The following Examples (2–6) shown continuous operation of the process employing a fixed bed of catalyst (304 grams, 10–20 mesh) in a tubular reactor (30 in. by 1 in. I.D.). In each instance, the reaction mixture was metered to the reactor and passed through the catalyst bed at constant pressure, temperature and space velocity. The product from the reactor was cooled, depressurized and the composition thereof determined by gas-liquid chromatography. The pertinent data are presented in Table II. As will be seen from the table, a substantial increase in the bela/alpha isomer ratio was obtained in each instance.

TABLE I.—ISOMERIZATION OF α-ISOPROPYLNAPTHHALENE TO β-ISOPROPYLNAPHTHALENE

| | | | | Feed Composition | | | | Product Composition | | | | |
|---|---|---|---|---|---|---|---|---|---|---|---|---|
| Run No. | Catalyst percent | T. (° C.) | Time, hr. | Percent N | Percent α IPN | Percent β IPN | Ratio Percent β/ percent α | Percent N | Percent α IPN | Percent β IPN | Ratio Percent β/ percent α | Percent PIPN |
| 1 | 10.0 | 50 | 1 | 0.7 | 63.5 | 35.8 | 0.56 | 0.7 | 63.5 | 35.8 | 0.56 | |
| 2 | 10.0 | 200 | 1 | 0.7 | 63.5 | 35.8 | 0.56 | 0.7 | 63.5 | 35.8 | 0.56 | |
| 3 | 10.0 | 50 | 2 | 0.7 | 63.5 | 35.8 | 0.56 | 0.7 | 63.5 | 35.8 | 0.56 | |
| 4 | 10.0 | 200 | 2 | 0.7 | 63.5 | 35.8 | 0.56 | 0.7 | 63.5 | 35.8 | 0.56 | |
| 5 | 11.2 | 275 | 2 | 0.66 | 42.0 | 64.8 | 1.54 | 2.98 | 31.6 | 64.8 | 2.05 | 3.39 |
| 6 | 11.2 | 350 | 2 | 0.7 | 63.5 | 35.8 | 0.56 | 16.1 | 13.0 | 52.5 | 4.04 | 18.4 |
| 7 | 11.2 | 350 | 0.5 | 0.7 | 63.5 | 35.8 | 0.56 | 13.2 | 13.5 | 51.4 | 3.80 | 21.9 |
| 8 | 11.2 | 372 | 0.25 | 0.7 | 63.5 | 35.8 | 0.56 | 22.7 | 7.3 | 38.4 | 5.30 | 31.6 |
| 9 | 1.0 | 350 | 4 | | | 70.8 | 29.2 | 0.41 | 8.7 | 33.7 | 44.1 | 1.31 | 13.5 |

N=Naphthalene; IPN=Isopropylnaphthalene; PIPN=Polyisopropylnaphthalenes.

TABLE II.—CONTINUOUS ISOMERIZATION OF α-ISOPROPYLNAPHTHALENE TO β-ISOPROPYLNAPHTHALENE

| | | | | Feed composition | | | | Product composition | | | |
|---|---|---|---|---|---|---|---|---|---|---|---|
| Exampe No. | Space Velocity hr.⁻¹ | Temp. °C. | Pres. p.s.i.g. | Percent N | Percent α IPN | Percent β IPN | Ratio Percent β/ Percent α | Percent N | Percent α IPN | Percent β IPN | Ratio Percent β/ Percent α |
| 2 | 1.0 | 275 | 700 | 62.33 | 13.63 | 19.75 | 1.44 | 63.14 | 3.21 | 29.18 | 9.09 |
| 3 | 1.5 | 325 | 500 | 73.14 | 8.13 | 11.83 | 1.45 | 76.47 | 2.02 | 18.24 | 9.03 |
| 4 | 1.0 | 375 | 300 | 62.33 | 13.63 | 19.75 | 1.45 | 69.24 | 2.88 | 26.07 | 9.05 |
| 5 | 2.0 | 375 | 300 | 82.32 | 5.34 | 7.44 | 1.40 | 83.85 | 1.52 | 10.77 | 7.10 |
| 6 | 2.0 | 375 | 700 | 61.00 | 14.46 | 20.90 | 1.44 | 60.68 | 2.95 | 26.51 | 9.00 |

N=Naphthalene; IPN=Isopropylnaphthalene.

We claim:
1. A process for increasing the ratio of beta to alpha isomer content in a mixture containing alpha and beta isopropyl naphthalenes which comprises contacting the mixture with at least 1%, based on the weight of said mixture, of a solid phosphoric acid catalyst at a temperature above about 275° C.
2. The process of claim 1 wherein the temperature is from about 275° C. to about 400° C.

References Cited

UNITED STATES PATENTS 2,515,237    7/1950    Kutz    260—668 XR
2,585,899    2/1952    Langlois    260—668
3,285,982    11/1966    Nixon    260—668 XR DELBERT E. GANTZ, Primary Examiner C. R. DAVIS, Assistant Examiner